US012794343B2

(12) United States Patent
Liu et al.

(10) Patent No.: US 12,794,343 B2
(45) Date of Patent: Nov. 10, 2026

(54) TWO-STAGE CONVERTER AND CONTROL METHOD THEREOF

(71) Applicant: Delta Electronics (Shanghai) Co., Ltd., Shanghai (CN)

(72) Inventors: Hong Liu, Shanghai (CN); Baihui Song, Shanghai (CN); Wen Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 227 days.

(21) Appl. No.: 18/624,817

(22) Filed: Apr. 2, 2024

(65) Prior Publication Data

US 2024/0339920 A1 Oct. 10, 2024

(30) Foreign Application Priority Data

Apr. 7, 2023 (CN) ......................... 202310376988.0

(51) Int. Cl.

| | |
|---|---|
| ***H02M 1/00*** | (2007.01) |
| ***H02M 1/14*** | (2006.01) |
| ***H02M 3/335*** | (2006.01) |
| ***H02M 7/217*** | (2006.01) |

(52) U.S. Cl.

CPC ......... *H02M 1/007* (2021.05); *H02M 1/0043* (2021.05); *H02M 1/14* (2013.01); *H02M 3/33576* (2013.01); *H02M 7/217* (2013.01)

(58) Field of Classification Search

CPC ...... H02M 1/007; H02M 1/0043; H02M 1/14; H02M 3/33576; H02M 7/217

See application file for complete search history.

(56) References Cited

U.S. PATENT DOCUMENTS

| | | | | |
|---|---|---|---|---|
| 9,331,565 B2 * | 5/2016 | Wei | .......................... | H02M 1/36 |
| 10,491,126 B1 * | 11/2019 | Pastore | ............. | H02M 3/33523 |
| 2013/0336017 A1 * | 12/2013 | Uno | .................... | H02M 3/3376 363/21.02 |

FOREIGN PATENT DOCUMENTS

| | | |
|---|---|---|
| CN | 105978370 B | 4/2019 |
| CN | 114771305 A | 7/2022 |
| CN | 114784929 A | 7/2022 |

* cited by examiner

*Primary Examiner* — Lakaisha Jackson

(74) *Attorney, Agent, or Firm* — KIRTON McCONKIE; Evan R. Witt

(57) ABSTRACT

A two-stage converter and a control method thereof are provided. The two-stage converter includes a first stage conversion unit, a capacitor unit and a second stage conversion unit. The first stage conversion unit receives a first power and converts the first power into a second power. The capacitor unit is electrically connected to the first stage conversion unit to receive the second power. The second stage conversion unit is electrically connected to the capacitor unit to receive a power transmitted by the capacitor unit. The first stage conversion unit receives a switch signal which has a switching cycle. In at least one said switching cycle, the two-stage converter performs a first control mode in which an operation state of the second stage conversion unit is adjusted according to an operation state of the first stage conversion unit.

20 Claims, 20 Drawing Sheets

TWO-STAGE CONVERTER AND CONTROL METHOD THEREOF

CROSS-REFERENCE TO RELATED APPLICATION

This application claims priority to China Patent Application No. 202310376988.0, filed on Apr. 7, 2023, and the entire contents of which are incorporated herein by reference for all purposes.

FIELD OF THE INVENTION

The present disclosure relates to a converter and a control method thereof, and more particularly to a two-stage converter and a control method thereof.

BACKGROUND OF THE INVENTION

As shown in FIG. 1, the two-stage single-phase isolated converter is commonly used in a solid-state transformer, which has broad application prospects in DC power devices and DC power generation devices, such as data centers, electric vehicle charging stations, photovoltaics, energy storage, and other DC power generation or consumption fields. The solid-state transformer is electrically connected to the AC grid, and each phase includes multiple converters with inputs connected in series and outputs connected in parallel. Each converter includes a front-stage (AC-DC converter) and a back-stage (DC-DC converter) which are electrically connected to each other through a DC-link capacitor.

The DC-link capacitor is used to absorb the double-frequency power of grid-side and the high-frequency component generated by the switching actions in the front-stage and back-stage. The effective value of the current flowing through the DC-link capacitor affects the type of the DC-link capacitor and thus affects the power density of the converter. The effective value of the capacitor current mainly includes three components which are the double-frequency component of the grid-side, the switching-frequency component from the front-stage and the double-switching-frequency component from the back-stage. The double-switching-frequency component from the back-stage may be suppressed by adding a high-frequency absorption capacitor. In order to absorb the double-frequency power of the grid-side and the switching-frequency ripple from the front-stage, a large DC-link capacitor is usually required, which limits further improvement in the power density of the converter.

For the above-mentioned converter, two kinds of control manners are usually adopted in conventional technologies. In the first control manner, a large electrolytic capacitor is disposed to absorb the double-frequency power of the grid-side and the switching-frequency ripple from the front-stage, and the back-stage is controlled to operate with constant power, resulting in high efficiency of the back-stage. However, the proportion of the front-stage switching-frequency current in the capacitor current is significant, leading to increased capacitor heating and affecting the device's lifespan. Further, it would be hard to further reduce the capacitance value of the DC-link capacitor.

In the second control manner, the carrier phase-shift control is employed for the front-stage, and the open-loop control is employed for the primary side circuit of the back-stage. The operating frequency is equal to the resonant frequency, and the secondary side circuit of the back-stage performs a synchronous rectification. The double-frequency power passes through the back-stages and is cancelled out at the parallel-connected outputs of the converters. In the second control manner, since the DC-link capacitor does not need to absorb the double-frequency power, the capacitance value of the DC-link capacitor can be reduced, thereby increasing the power density of the converter. However, compared with the control manner that utilizes the DC-link capacitor to absorb the double-frequency power, the effective value of the resonant current is increases by about 1.2 times since the double-frequency power passes through the back-stage. Accordingly, the conduction loss of switches and the transformer loss are increased, and the efficiency of the back-stage is decreased.

Therefore, there is a need of providing a two-stage converter and a control method thereof in order to overcome the drawbacks of the conventional technologies.

SUMMARY OF THE INVENTION

The present disclosure provides a two-stage converter and a control method thereof in which the operation state of the back-stage is adjusted according to the operation state of the front-stage for reducing the double-frequency ripple and front-stage switching-frequency ripple in the current flowing through the capacitor between the front-stage and back-stage. Thereby, the power density and efficiency of the two-stage converter are improved.

In accordance with an aspect of the present disclosure, a two-stage converter is provided. The two-stage converter includes a first stage conversion unit, a capacitor unit and a second stage conversion unit. The first stage conversion unit receives a first power and converts the first power into a second power. The capacitor unit is electrically connected to the first stage conversion unit to receive the second power. The second stage conversion unit is electrically connected to the capacitor unit to receive a power transmitted by the capacitor unit. The first stage conversion unit receives a switch signal which has a switching cycle. In at least one said switching cycle, the two-stage converter performs a first control mode in which an operation state of the second stage conversion unit is adjusted according to an operation state of the first stage conversion unit.

In accordance with another aspect of the present disclosure, a control method of a two-stage converter is provided. The two-stage converter includes a first stage conversion unit, a capacitor unit and a second stage conversion unit. The first stage conversion unit receives a first power and converts the first power into a second power. The capacitor unit is electrically connected to the first stage conversion unit to receive the second power. The second stage conversion unit is electrically connected to the capacitor unit to receive a power transmitted by the capacitor unit. The first stage conversion unit receives a switch signal which has a switching cycle. The control method includes: in at least one said switching cycle, controlling the two-stage converter to perform a first control mode in which an operation state of the second stage conversion unit is adjusted according to an operation state of the first stage conversion unit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
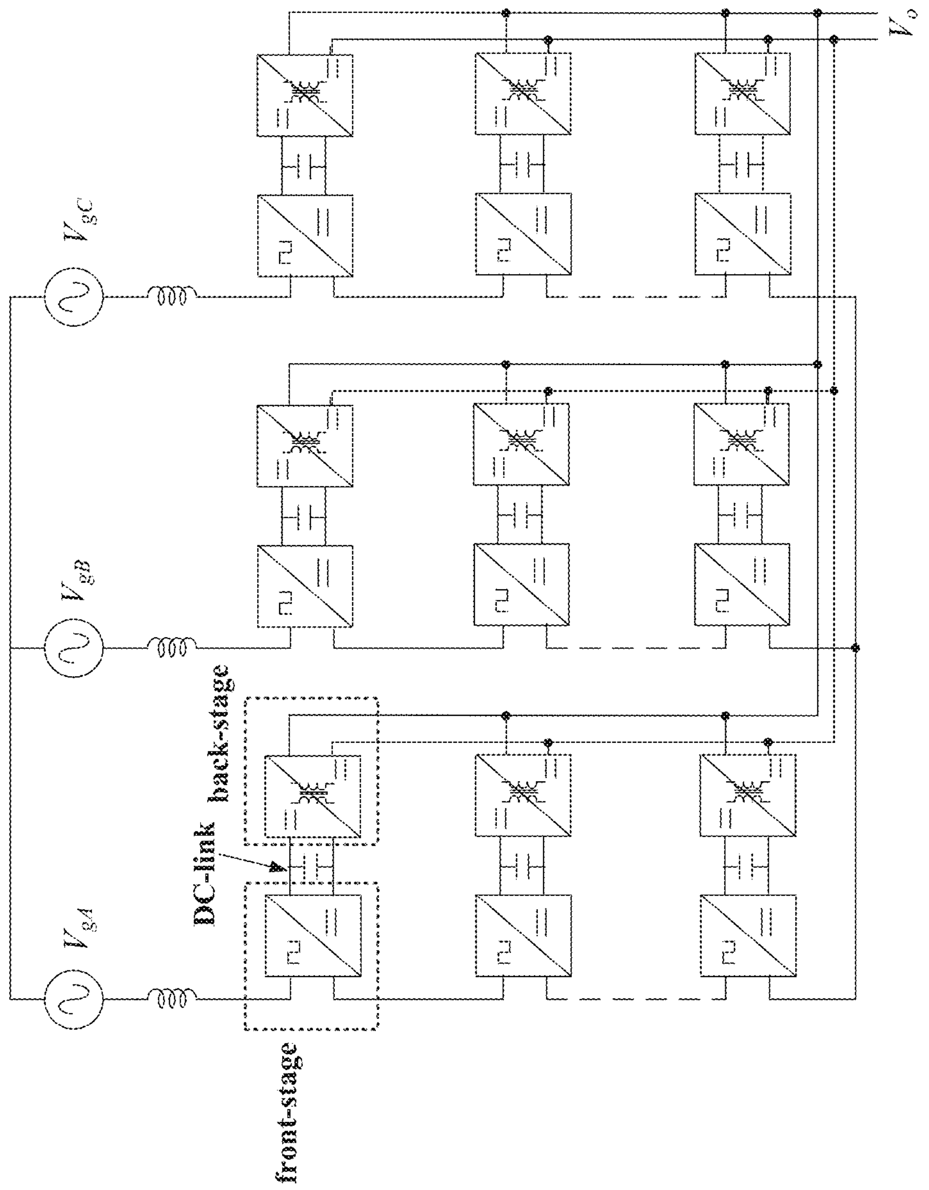
FIG. 1 PRIOR ART
FIG. 1 is a schematic circuit diagram illustrating a conventional solid-state transformer.
Figure 2:
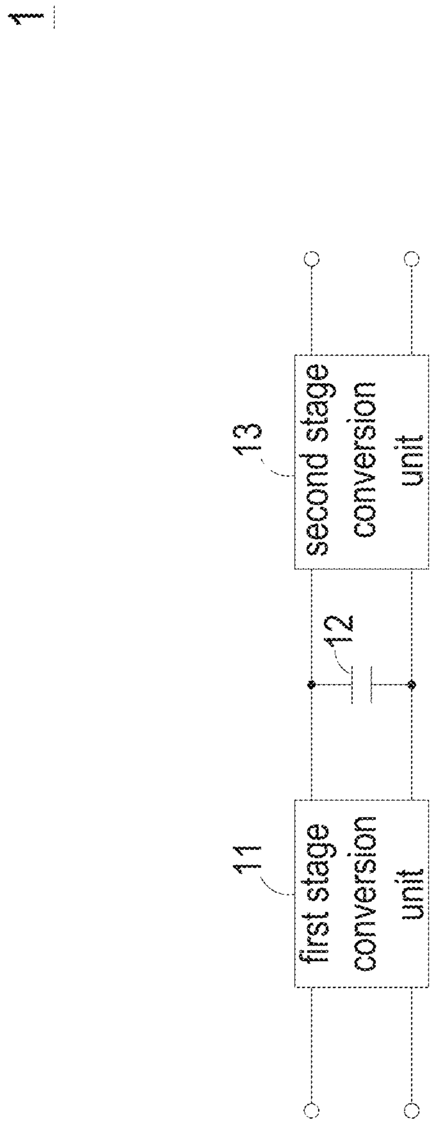
FIG. 2 is a schematic circuit block diagram illustrating a two-stage converter according to an embodiment of the present disclosure.

FIG. 2 is a schematic circuit block diagram illustrating a two-stage converter according to an embodiment of the present disclosure. As shown in FIG. 2, the two-stage converter 1 includes a first stage conversion unit 11, a capacitor unit 12 and a second stage conversion unit 13. The first stage conversion unit 11 receives a first power and converts the first power into a second power. The capacitor unit 12 is electrically connected to the first stage conversion unit 11 to receive the second power. The second stage conversion unit 13 is electrically connected to the capacitor unit 12 to receive the power transmitted by the capacitor unit 12. The first stage conversion unit 11 receives switch signals which have a first switching cycle. In at least one first switching cycle, the two-stage converter 1 performs a first control mode in which the two-stage converter 1 adjusts the operation state of the second stage conversion unit 13 according to the operation state of the first stage conversion unit 11. In an embodiment, in the first control mode, when the operation state of the first stage conversion unit 11 is stopping outputting the second power, the operation state of the second stage conversion unit 13 is adjusted to stop operating (e.g., the switches of the second stage conversion unit 13 remain off). Alternatively, when the operation state of the first stage conversion unit 11 is outputting the second power, the operation state of the second stage conversion unit 13 is adjusted to operate normally (e.g., the switches of the second stage conversion unit 13 switch normally).

The case that the first stage conversion unit 11 and the second stage conversion unit 13 are a bridge power factor correction circuit and an LLC circuit respectively is exemplified for describing the operation of the two-stage converter of the present disclosure. However, it is noted that the specific topologies of the first stage conversion unit 11 and second stage conversion unit 13 of the present disclosure are not limited thereto.

Figure 3:
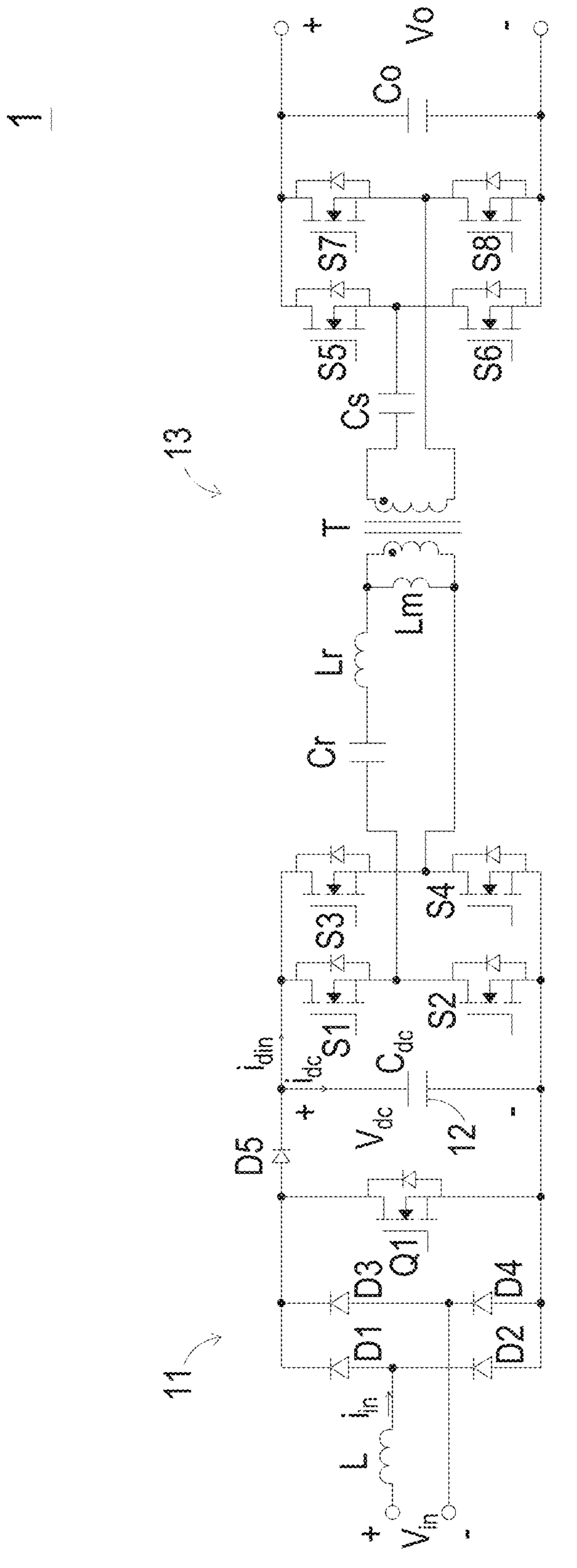
FIG. 3 is a schematic circuit diagram illustrating an implementation of the two-stage converter of FIG. 2.

FIG. 3 is a schematic circuit diagram illustrating an implementation of the two-stage converter of FIG. 2. As shown in FIG. 3, the first stage conversion unit 11 includes an inductor L, diodes D1, D2, D3, D4 and D5, and a first stage switch Q1. The diodes D1 and D2 are electrically connected in series to form a diode bridge arm, and the inductor L is electrically connected to a common node between the diodes D1 and D2. The diodes D3 and D4 are electrically connected in series to form another diode bridge arm. The said two diode bridge arms and the first stage switch Q1 are electrically connected in parallel. The anode of diode D5 is electrically connected to a first terminal of the first stage switch Q1. The capacitor unit 12 includes a DC-link capacitor $C_{dc}$, and two terminals of the DC-link capacitor $C_{dc}$ are electrically connected to the cathode of diode D5 and a second terminal of the first stage switch Q1 respectively. $V_{in}$ is the input voltage, $i_{in}$ is the input current of the first stage conversion unit 11 (i.e., the current flowing through the inductor L), $i_{dc}$ is the current flowing through the DC-link capacitor $C_{dc}$, $V_{dc}$ is the voltage of the DC-link capacitor $C_{dc}$, and $i_{din}$ is the current flowing into the second stage conversion unit 13. The input voltage $V_{in}$ has an AC voltage cycle, for example, when the two-stage converter is coupled to the power grid, the input voltage $V_{in}$ is the AC voltage at operating frequency and has a cycle of 20 ms.

The second stage conversion unit 13 includes primary switches S1, S2, S3 and S4, a resonant capacitor Cr, a resonant inductor Lr, a transformer T, a blocking capacitor Cs, secondary switches S5, S6, S7 and S8, and an output capacitor Co. The primary switches S1 and S2 are electrically connected in series to form a primary switch bridge arm, the primary switches S3 and S4 are electrically connected in series to form another primary switch bridge arm, and the two primary switch bridge arms and the DC-link capacitor $C_{dc}$ are electrically connected in parallel. The resonant capacitor Cr, the resonant inductor Lr and the primary winding of transformer T are electrically connected in series between a common node of the primary switches S1 and S2 and a common node of the primary switches S3 and S4. The secondary switches S5 and S6 are electrically connected in series to form a secondary switch bridge arm, the secondary switch S7 and S8 are electrically connected in series to form another secondary switch bridge arm, and the two secondary switch bridge arms and the output capacitor Co are electrically connected in parallel. The blocking capacitor Cs and the secondary winding of transformer T are electrically connected in series between a common node of the secondary switches S5 and S6 and a common node of the secondary switches S7 and S8. Lm is the magnetizing inductor, and Vo is the output voltage.

Figure 4:
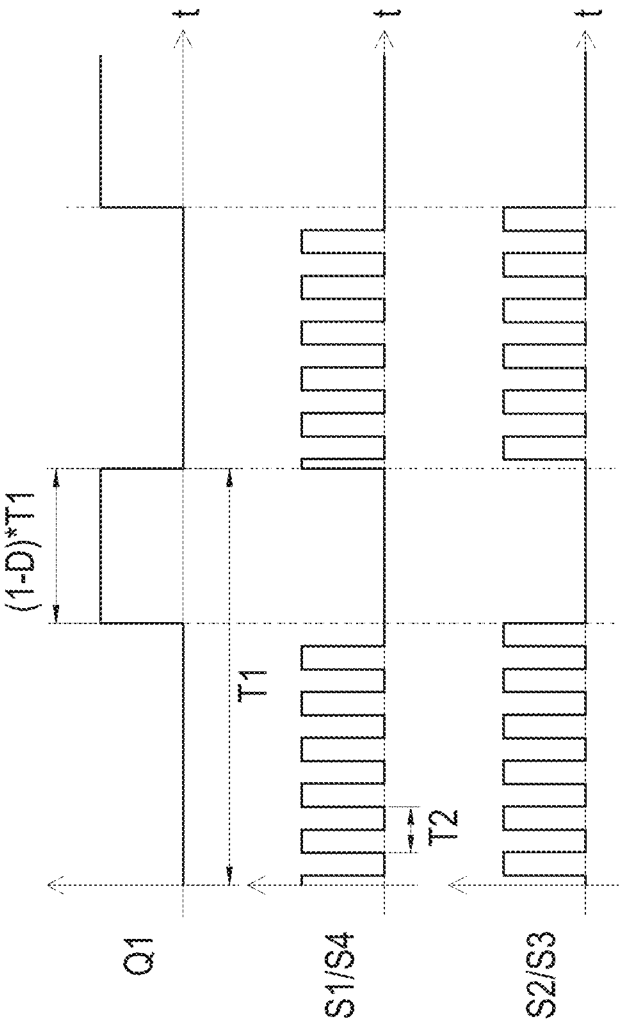
FIG. 4 schematically shows switch signals of a part of the switches of the two-stage converter of FIG. 3 performing the first control mode.

FIG. 4 schematically shows switch signals of a part of the switches of the two-stage converter 1 of FIG. 3 performing the first control mode. In FIG. 4, Q1 represents the switch signal of the first stage switch Q1 (i.e., the switch signal received by the first stage conversion unit 11), S1/S4 represents the switch signal of the primary switches S1 and S4, and S2/S3 represents the switch signal of the primary switches S2 and S3. D is the duty ratio of the first stage conversion unit 11 outputting the second power, T1 is the first switching cycle of the first stage conversion unit 11, T2 is the second switching cycle of the second stage conversion unit 13, and the first switching cycle T1 is greater than the second switching cycle T2. In general, the first switching cycle T1 is in multiples of the second switching cycle T2. Under the circumstance that the two-stage converter 1 performs the first control mode, as shown in FIG. 3 and FIG. 4, when the first stage switch Q1 is in the off state, the switch signal of the first stage switch Q1 is at a first level (e.g., at low level "0"), and the first stage conversion unit 11 outputs the second power. At this time, the second stage conversion unit 13 receives the high-frequency switch signals and works in a hold (DCX) mode, the primary switches S1 to S4 are switched normally with high frequency, and the work frequency of the second stage conversion unit 13 is equal to the resonant frequency. When the first stage switch Q1 is in the on state, the switch signal of the first stage switch Q1 is at a second level (e.g., at high level "1"), the output of the first stage conversion unit 11 is short-circuited, and the first stage conversion unit 11 stops outputting the second power. At this time, the second stage conversion unit 13 stops operating, and the primary switches S1 to S4 are maintained in the off state (e.g., the switch signals of primary switches S1 to S4 are blocked). The enabling and disabling cycle of the second stage conversion unit 13 is equal to the first switching cycle T1 of the first stage conversion unit 11. Further, when the first stage conversion unit 11 stops outputting the second power and the second stage conversion unit 13 stops operating, the DC-link capacitor $C_{dc}$ is neither charged nor discharged, and thus the front-stage switching-frequency component would not be generated.

From the above descriptions, when the two-stage converter 1 performs the first control mode, the second stage conversion unit 13 operates normally only when the first stage conversion unit 11 outputs power, and the second stage conversion unit 13 stops operating when the first stage conversion unit 11 stops outputting power. In other words, the first stage conversion unit 11 and the second stage conversion unit 13 output powers synchronously. Accordingly, the double-frequency ripple and front-stage switching-frequency ripple in the current flowing through the capacitor unit 12 are reduced, the capacitance value of the capacitor unit 12 is reduced, and the power density of the two-stage converter 1 is improved. Moreover, since the second stage conversion unit 13 stops operating when the first stage conversion unit 11 stops outputting power, the transformer loss and switching loss of the second stage conversion unit 13 are reduced, which is beneficial for improving efficiency.

Figure 5:
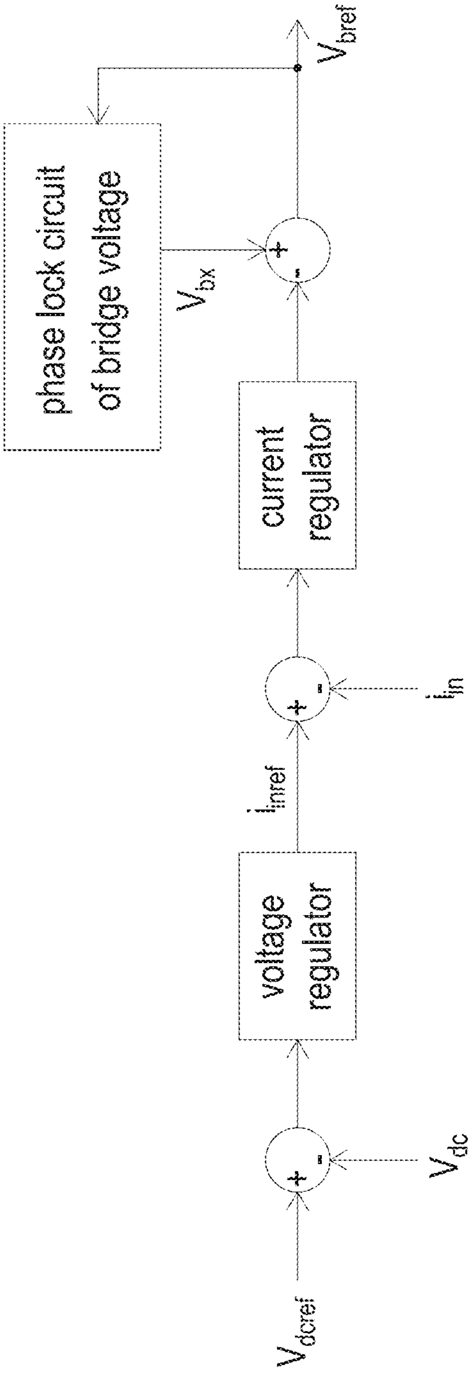
FIG. 5 is a schematic block diagram illustrating the controller for the first stage conversion unit of FIG. 3.

FIG. 5 is a schematic block diagram illustrating the controller for the first stage conversion unit 11 of FIG. 3. As shown in FIG. 5, the controller for the first stage conversion unit 11 mainly includes a phase lock circuit of bridge voltage, a voltage regulator and a current regulator. In specific, the voltage regulator is configured to adjust a difference between a voltage $V_{dc}$ (actual voltage) of the capacitor unit 12 and a corresponding reference voltage $V_{dcref}$, to obtain a reference current $i_{inref}$ of an input current $i_{in}$ of the first stage conversion unit 11. The current regulator is configured to adjust a difference between the reference current $i_{inref}$ and the input current $i_{in}$ (actual current), to obtain an adjusted signal. Subtract the adjusted signal from a sinusoidal fundamental signal $V_{bx}$, to obtain a reference bridge voltage $V_{bref}$. The phase lock circuit of bridge voltage is configured to lock the reference bridge voltage $V_{bref}$, to obtain the sinusoidal fundamental signal $V_{bx}$. The sinusoidal fundamental signal $V_{bx}$ is in the same phase with the bridge voltage of the first stage conversion unit 11. According to the reference bridge voltage $V_{bref}$ and the reference voltage $V_{dcref}$ of the capacitor unit 12, calculated a duty ratio $D_{Q1}$ of the first stage switch Q1 of the first stage conversion unit 11. The above-mentioned control may be implemented by the controller of the two-stage converter.

The first stage conversion unit 11 has a plurality of first signals reflecting the operation state thereof (i.e., outputting power or stopping outputting power), and the plurality of first signals may include a switch signal of the first stage switch Q1 and a current signal flowing through the diode D5, but not exclusively. The capacitor unit 12 has a plurality of second signals reflecting the operation state of the first stage conversion unit 11, and the plurality of second signals may include a power signal of the capacitor unit 12, a current signal of the capacitor unit 12, and a voltage signal of the capacitor unit 12, but not exclusively. The two-stage converter 1 determines the operation state of the first stage conversion unit 11 according to at least one first signal or at least one second signal.

Figure 6:
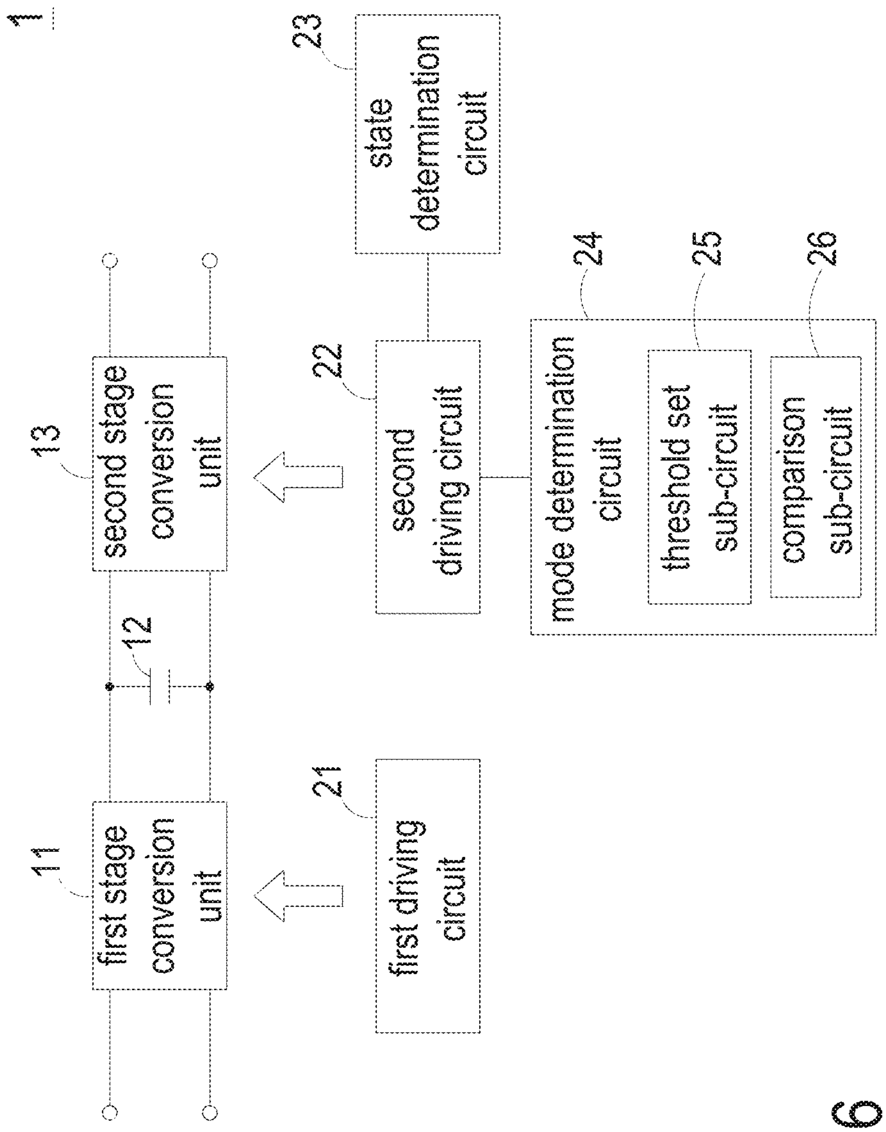
FIG. 6 is a schematic circuit diagram illustrating another implementation of the two-stage converter of FIG. 2.

In an embodiment, as shown in FIG. 6, the two-stage converter 1 further includes a first driving circuit 21, a second driving circuit 22 and a state determination circuit 23. The first driving circuit 21 is configured to output switch signals to the first stage conversion unit 11. The state determination circuit 23 is configured to determine the operation state of the first stage conversion unit 11 according to at least one signal in the two-stage converter 1. The second driving circuit 22 is configured to output or stop outputting high-frequency switch signals to the second stage conversion unit 13 for adjusting the operation state of the second stage conversion unit 13. For example, the second driving circuit 22 outputs or stops outputting the high-frequency switch signals according to the determination result of the state determination circuit 23 (i.e., according to the operation state of the first stage conversion unit 11).

The first driving circuit 21, the second driving circuit 22 and the state determination circuit 23 are all implemented by the controller (not shown) of the two-stage converter 1. The controller may be or include an analog circuit, a microprocessor, a digital signal processor (DSP), an application specific integrated circuit (ASIC), and/or a field-programmable gate array (FPGA). In an embodiment, the controller may be implemented as multiple controllers.

In addition, the time of the first stage conversion unit 11 outputting the second power is short (i.e., the duty ratio D is small) around the zero-crossing point of the input current of the first stage conversion unit 11, and there are sampling errors and delays in the signals that reflect the operation state of the first stage conversion unit 11, which would affect the determination of whether the first stage conversion unit 11 outputs the second power or not. Moreover, when the time of the first stage conversion unit 11 outputting the second power is short, the effect on suppressing the front-stage switching-frequency ripple by enabling and disabling the front-stage and back-stage synchronously is not significant.

Taking the circuit topology of FIG. 3 and the control block diagram of FIG. 5 as an example, around the zero-crossing point of the input current $i_{in}$, the second power outputted by the first stage conversion unit 11 is small, and the reference bridge voltage $V_{bref}$ is low. At this time, the duty ratio $D_{Q1}$ of the first stage switch Q1 of the first stage conversion unit 11 is large, because the duty ratio $D_{Q1}$ is calculated based on the reference bridge voltage $V_{bref}$ and the reference voltage $V_{dcref}$ of the capacitor unit 12. Further, the duty ratio D of the first stage conversion unit 11 outputting the second power is equal to $1\text{-}D_{Q1}$, and thus the duty ratio D is small, namely the time of the first stage conversion unit 11 outputting the second power is short. Under this circumstance, the errors caused by sampling accuracy cannot be ignored, which makes it difficult to accurately determine the time of the first stage conversion unit 11 outputting the second power. Additionally, if the first control mode is performed when the duty ratio D of the first stage conversion unit 11 outputting the second power is small, the second stage conversion unit 13 operates shortly and stops operating for most of the time in one first switching cycle T1 of the first stage conversion unit 11. Accordingly, the effect on suppressing the front-stage switching-frequency ripple is not significant.

As an extreme situation, the time of the first stage conversion unit 11 outputting the second power may be really short around the zero-crossing point of the input current $i_{in}$. Therefore, in the first switching cycle T1, when this extreme situation occurs, the two-stage converter 1 performs a second control mode. In the second control mode, the second stage conversion unit 13 operates normally and continuously, and the second stage conversion unit 13 is not stopped operating when the first stage conversion unit 11 stops outputting the second power. Consequently, the synchronous enabling and disabling control for the front-stage and back-stage is not performed around the zero-crossing point of the input current but is performed in the remaining time. Thereby, the misjudgment to the operation state of the first stage conversion unit is prevented, and the situation that the second stage conversion unit almost stops operating all time in one or multiple switching cycles of the front-stage can be avoid.

In order to determine the proper control mode of the two-stage converter 1, in an embodiment, as shown in FIG. 6, the two-stage converter 1 further includes a mode determination circuit 24. In some embodiments, the mode determination circuit 24 is configured to determine the control mode of the two-stage converter 1 in each first switching cycle T1 according to the time of the first stage conversion unit 11 outputting the second power. In some embodiments, the mode determination circuit 24 is configured to determine the control mode of the two-stage converter 1 in each first switching cycle T1 according to the input current $i_{in}$ of the first stage conversion unit 11.

In this embodiment, the second driving circuit 22 is configured to output or stop outputting the high-frequency switch signals to the second stage conversion unit 13 for adjusting the operation state of the second stage conversion unit 13. The second driving circuit 22 outputs or stops outputting the high-frequency switch signals according to a determination result of the state determination circuit 23 and the mode determination circuit 24 (i.e., according to the operation state of the first stage conversion unit 11 and the control mode of the two-stage converter 1).

The first driving circuit 21, the second driving circuit 22, the state determination circuit 23 and the mode determination circuit 24 are all implemented by the controller (not shown) of the two-stage converter 1. The controller may be a control chip (e.g., MCU or DSP) or a processor.

In one first switching cycle T1 of the first stage conversion unit 11, when the mode determination circuit 24 determines that the two-stage converter 1 performs the first control mode and the state determination circuit 23 determines that the first stage conversion unit 11 is outputting the second power, the second driving circuit 22 outputs the high-frequency switch signals to the second stage conversion unit 13, and the second stage conversion unit 13 operates normally. In one first switching cycle T1 of the first stage conversion unit 11, when the mode determination circuit 24 determines that the two-stage converter 1 performs the first control mode and the state determination circuit 23 determines that the first stage conversion unit 11 stops outputting the second power, the second driving circuit 22 blocks the high-frequency switch signals, and the second stage conversion unit 13 stops operating.

In one first switching cycle T1 of the first stage conversion unit 11, when the mode determination circuit 24 determines that the two-stage converter 1 performs the second control mode, the second driving circuit 22 keeps outputting the high-frequency switch signals to the second stage conversion unit 13 and the second stage conversion unit 13 operates normally and continuously regardless of the operation state of first stage conversion unit 11 determined by the state determination circuit 23.

In an embodiment, the mode determination circuit 24 includes a threshold set sub-circuit 25 and a comparison sub-circuit 26. In the implementation that the mode determination circuit 24 determines the control mode of the two-stage converter 1 in each first switching cycle T1 according to the input current $i_{in}$ of the first stage conversion unit 11, the threshold set sub-circuit 25 is configured to set a threshold current, and the comparison sub-circuit 26 is configured to compare the absolute value of input current $i_{in}$ with the threshold current during each first switching cycle T1. If the absolute value of the input current $i_{in}$ is greater than the threshold current, the comparison sub-circuit 26 determines that the two-stage converter 1 performs the first control mode. If the absolute value of input current $i_{in}$ is less than or equal to the threshold current, the comparison sub-circuit 26 determines that the two-stage converter 1 performs the second control mode.

In the implementation that the mode determination circuit 24 determines the control mode of the two-stage converter 1 in each first switching cycle T1 according to the time of the first stage conversion unit 11 outputting the second power, the threshold set sub-circuit 25 is configured to calculate a threshold duty ratio according to a first ratio value and a second ratio value and to calculate a threshold time according to the threshold duty ratio and the first switching cycle T1, and the comparison sub-circuit 26 is configured to compare the time of the first stage conversion unit 11 outputting the second power with the threshold time during each first switching cycle T1. If the time of the first stage conversion unit 11 outputting the second power is longer than the threshold time, the comparison sub-circuit 26 determines that the two-stage converter 1 performs the first control mode. If the time of the first stage conversion unit 11 outputting the second power is shorter than or equal to the threshold time, the comparison sub-circuit 26 determines that the two-stage converter 1 performs the second control mode.

In another embodiment, the comparison sub-circuit 26 may be configured to compare the duty ratio of the first stage conversion unit 11 outputting the second power with the threshold duty ratio during each first switching cycle T1. If the duty ratio of the first stage conversion unit 11 outputting the second power is greater than the threshold duty ratio, the comparison sub-circuit 26 determines that the two-stage converter 1 performs the first control mode. If the duty ratio of the first stage conversion unit 11 outputting the second power is less than or equal to the threshold duty ratio, the comparison sub-circuit 26 determines that the two-stage converter 1 performs the second control mode.

The process of the threshold set sub-circuit 25 calculating the threshold duty ratio according to the first and second ratio values in this implementation is described in detail as follows.

In any first switching cycle T1, the switching-frequency current in the capacitor unit 12 has a first effective value when the two-stage converter 1 performs the first control mode, and the switching-frequency current in the capacitor unit 12 has a second effective value when the two-stage converter 1 performs the second control mode. If the affection from the second stage conversion unit is ignored, the ratio value of the first effective value to the input current $i_{in}$ is the first ratio value k1 which may be expressed as k1=F (D), and F (D) is the expression about the duty ratio D. The ratio value of the second effective value to the input current $i_{in}$ is the second ratio value k2 which may be expressed as k2=G (D), and G (D) is the expression about the duty ratio D. The threshold set sub-circuit 25 sets the duty ratio that satisfies the equation $$\frac{k2-k1}{k2}=M$$

as the threshold duty ratio, and M is a preset value which can be adjusted according to actual requirements. For example, M may be set according to the desired decrement of the effective value of front-stage switching-frequency current in the capacitor current.

The specific contents of the expressions F (D) and G (D) depend on the practical circuit topology. For example, in the circuit topology shown in FIG. 3, $$k1=F(D)=\sqrt{D\,(1-D)^2},\ k2=G(D)=\sqrt{D\,(1-D)}.$$

In another embodiment, the second-stage conversion unit 13 doesn't follow the first stage conversion unit 11 to be enabled and disabled synchronously (i.e., the two-stage converter 1 performs the second control mode) during the time period around the zero-crossing point of the input current $i_{in}$, and the second-stage conversion unit 13 follows the first stage conversion unit 11 to be enabled and disabled synchronously (i.e., the two-stage converter 1 performs the first control mode) in the remaining time. This embodiment doesn't require the mode determination and is easy to implement.

One AC voltage cycle includes multiple first switching cycles, and the two-stage converter 1 performs the first control mode in at least one of the multiple first switching cycles. In an embodiment, in one AC voltage cycle, the two-stage converter 1 performs the first control mode in most of the multiple first switching cycles, and the two-stage converter 1 only performs the second control mode in a few of the multiple first switching cycles when the input current is around the zero-crossing point.

Figure 7:
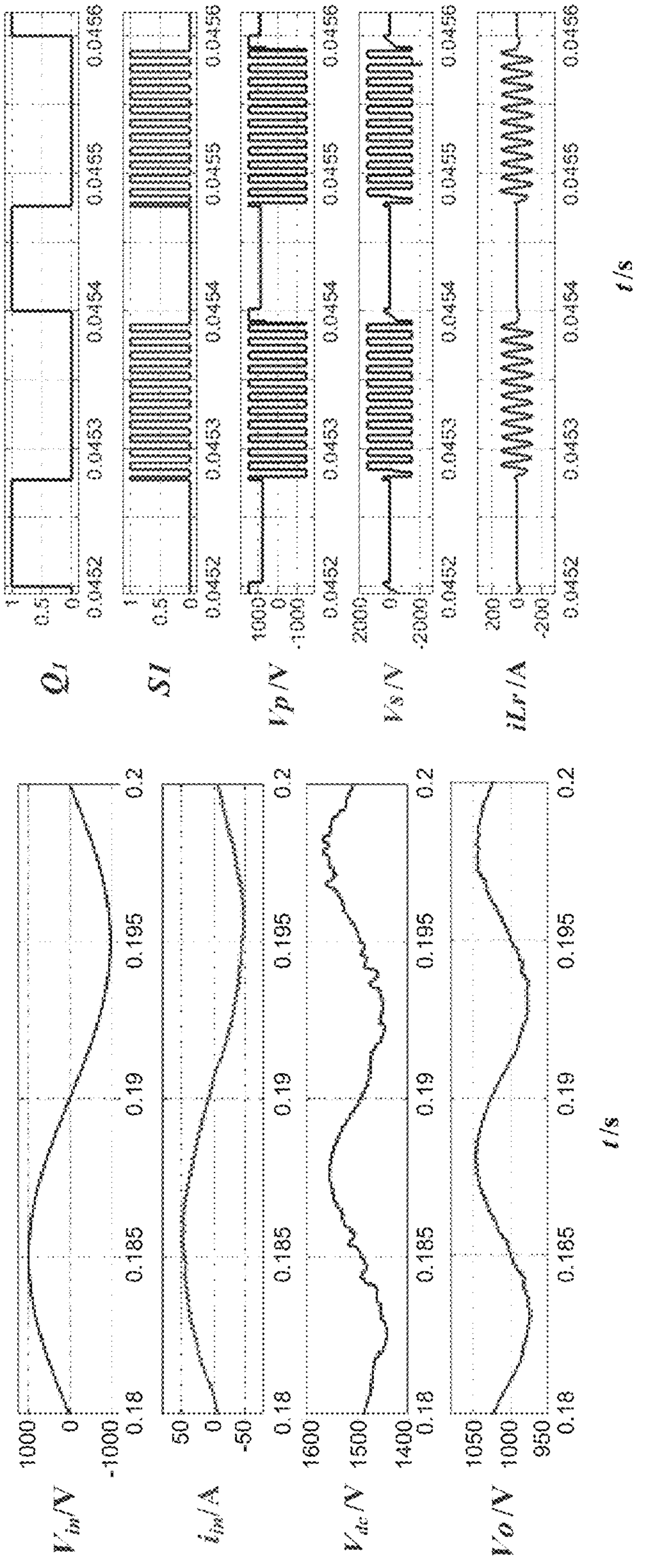
FIG. 7 schematically shows the simulation of the two-stage converter of FIG. 3 performing the first control mode.

FIG. 7 schematically shows the simulation of the two-stage converter of FIG. 3 performing the first control mode. In FIG. 7, the AC voltage cycle is 0.02 s, the first switching cycle is 200 μs, and the second switching cycle is 10 μs. For simplicity, only two first switching cycles are shown in FIG. 7. As shown in FIG. 7, when the first control mode is performed, the input current $i_{in}$ and output voltage Vo are stable, and the enabling and disabling cycle of the second-stage conversion unit 13 is equal to the switching cycle of the first stage conversion unit 11. The second stage conversion unit 13 operates only when the first stage conversion unit 11 outputs power. When the second stage conversion unit 13 stops operating, the currents iLr and iLm flowing through the resonant inductor Lr and magnetizing inductor Lm respectively decrease to zero, which makes the loss become zero. In addition, in FIG. 7, Vp and Vs are the voltages across the primary and secondary windings of the transformer T respectively.

Figure 8A:
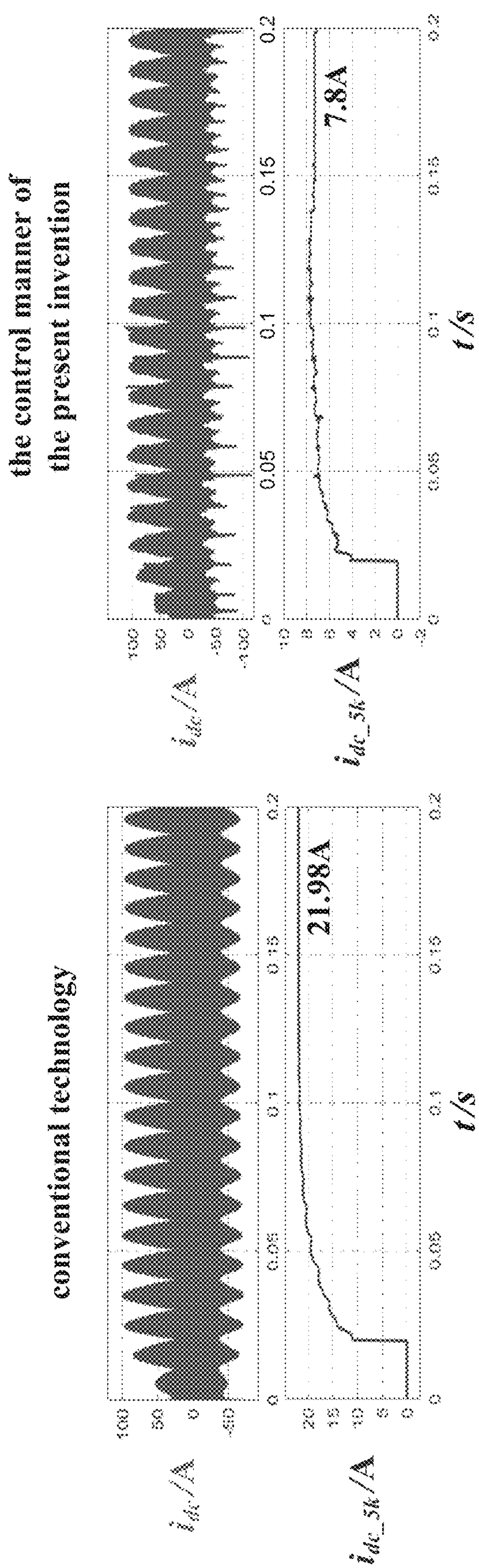
FIG. 8A and FIG. 8B are the schematic oscillograms of the circuit of FIG. 3 adopting the second control manner of conventional technology and the control manner of the present invention.
Figure 8B:
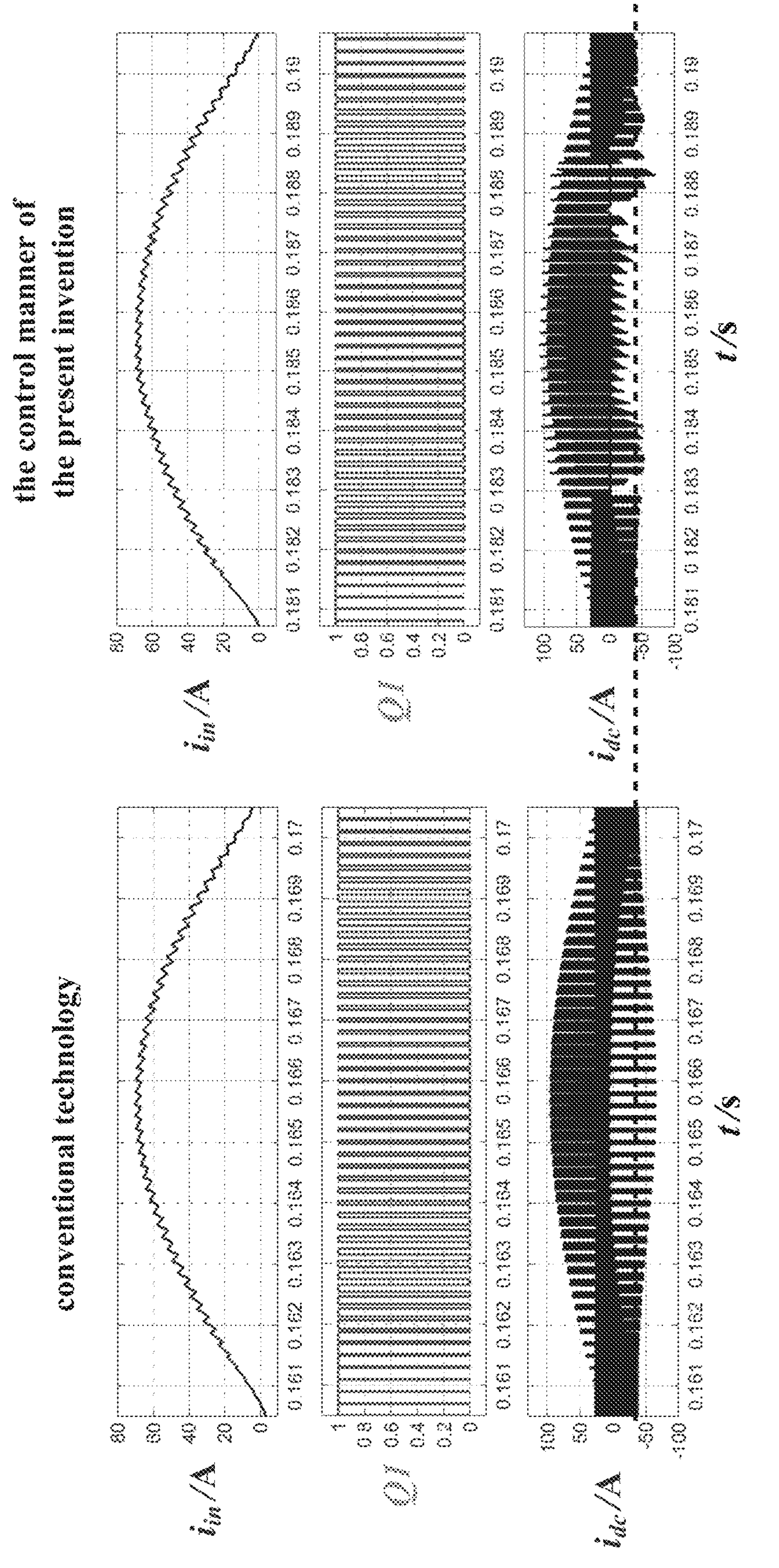

FIG. 8A and FIG. 8B are the schematic oscillograms of the circuit of FIG. 3 adopting the second control manner of conventional technology and the control manner of the present invention. In the control manner of the present invention, the second stage conversion unit is enabled and disabled according to the operation state of the first stage conversion unit, thereby reducing the front-stage switching-frequency component $i_{dc\_5k}$ in the current $i_{dc}$ flowing through the DC-link capacitor $C_{dc}$. The switching frequency of the front stage is 5 kHz. As shown in FIG. 8A, the peak value of the front-stage switching-frequency component $i_{dc\_5k}$ in the capacitor current is about 21.98 A when the second control manner of conventional technology is adopted, while the peak value of the front-stage switching-frequency component $i_{dc\_5k}$ in the capacitor current is about 7.8 A when the control manner of the present invention is adopted. Compared to the peak value of the front-stage switching-frequency component $i_{dc\_5k}$ under the second control manner of conventional technology, the peak value of the front-stage switching-frequency component $i_{dc\_5k}$ under the control manner of the present invention is reduced by 64%. As shown in FIG. 8B, the dashed lines show that the control manner of the present invention effectively reduces the ripple in the current $i_{dc}$ flowing through the DC-link capacitor $C_{dc}$ and the losses of the second stage conversion unit 13.

Figure 9A:
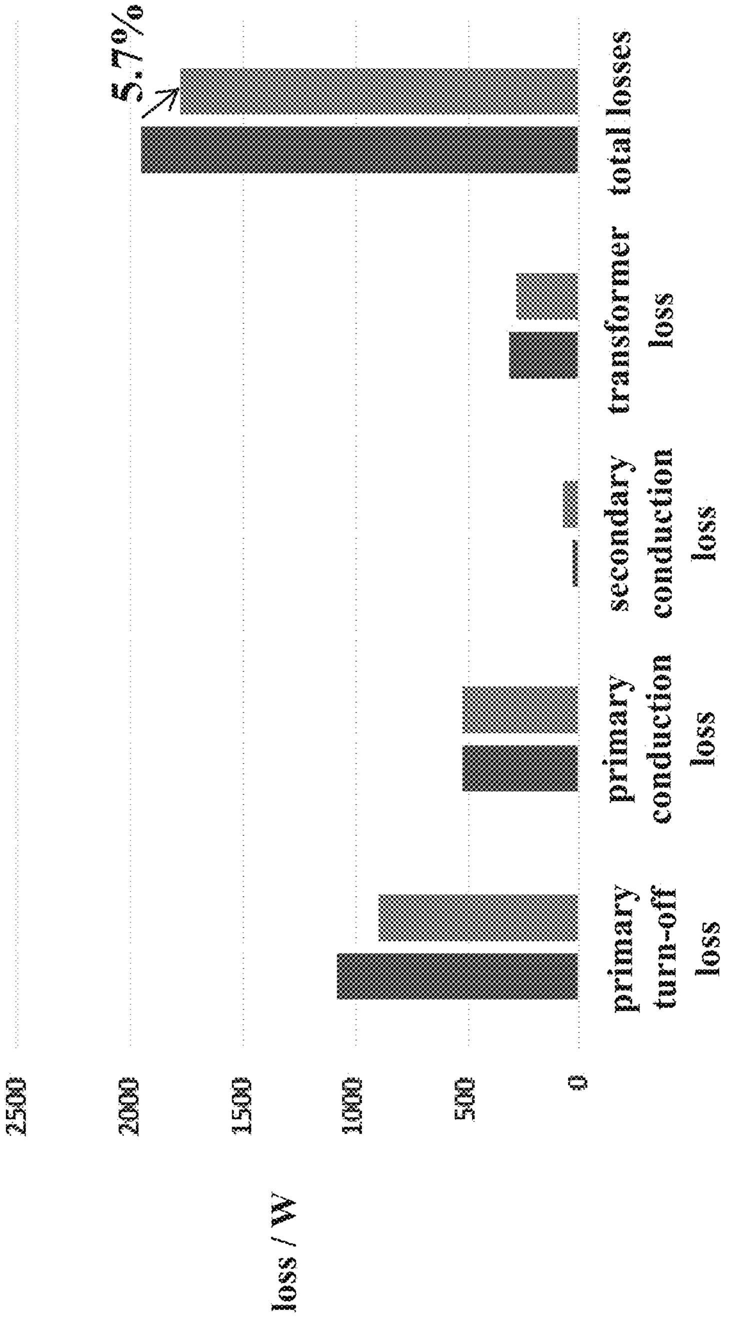
FIG. 9A and FIG. 9B show the losses of the circuit of FIG. 3 adopting the second control manner of conventional technology and the control manner of the present invention under different loads.
Figure 9B:
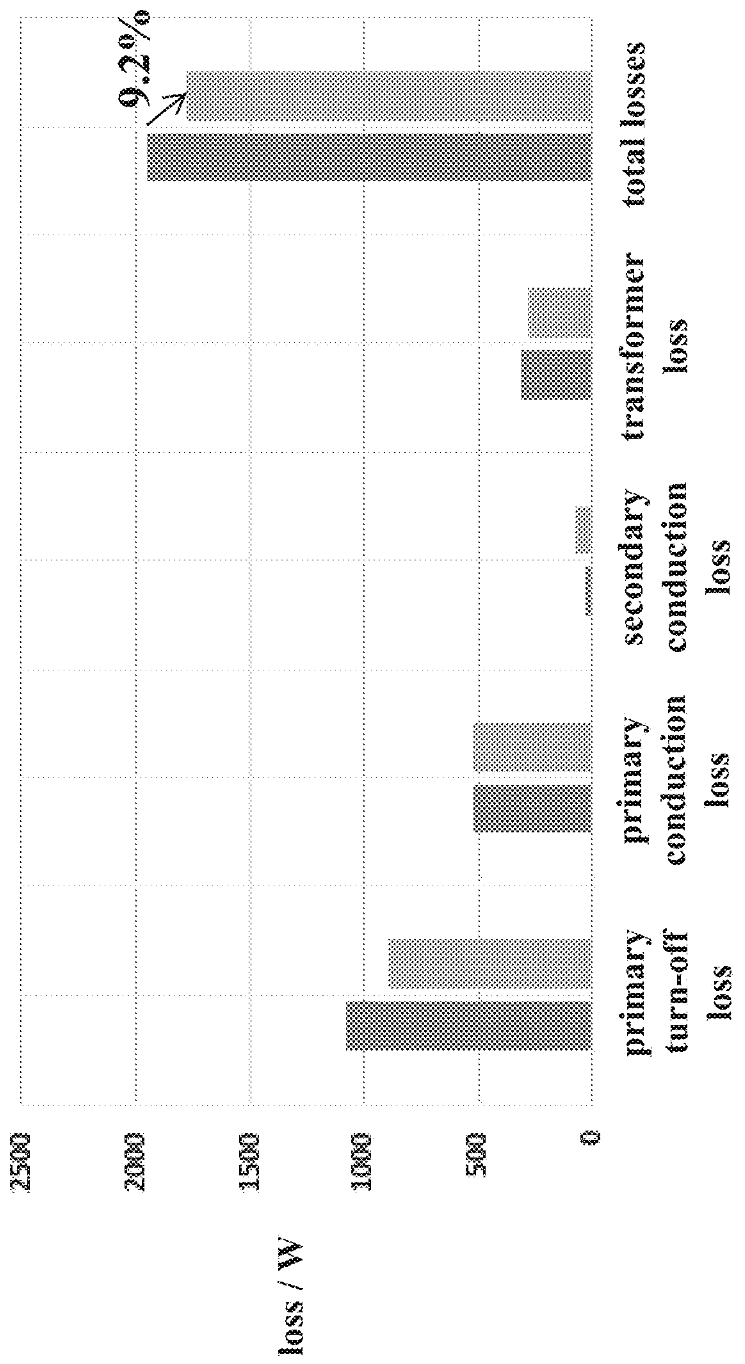

FIG. 9A and FIG. 9B show the losses of the circuit of FIG. 3 adopting the second control manner of conventional technology and the control manner of the present invention under different loads. FIG. 9A and FIG. 9B show the cases that the two-stage converter 1 operates under heavy load (e.g., with an output current of 25 A) and light load (e.g., with an output current of 10 A) respectively. In FIG. 9A and FIG. 9B, the cylinders with dark and light colors represent the losses of adopting the conventional technology and the present invention respectively. As shown in FIG. 9A and FIG. 9B, the control manner of the present invention reduces the primary turn-off loss and the transformer loss of the second stage conversion unit 13. Although the secondary conduction loss of the second stage conversion unit 13 increase, the overall losses still decrease since the primary turn-off loss has a large proportion. Under heavy load, as shown in FIG. 9A, the total losses of the second stage conversion unit 13 is decreased by 5.7% through adopting the control manner of the present invention. Under light load, as shown in FIG. 9B, the proportion of the primary turn-off loss is even larger, and thus the total losses of the second stage conversion unit 13 is decreased by 9.2% through adopting the control manner of the present invention, resulting in a greater efficiency improvement of the second stage conversion unit 13.

Figure 10:
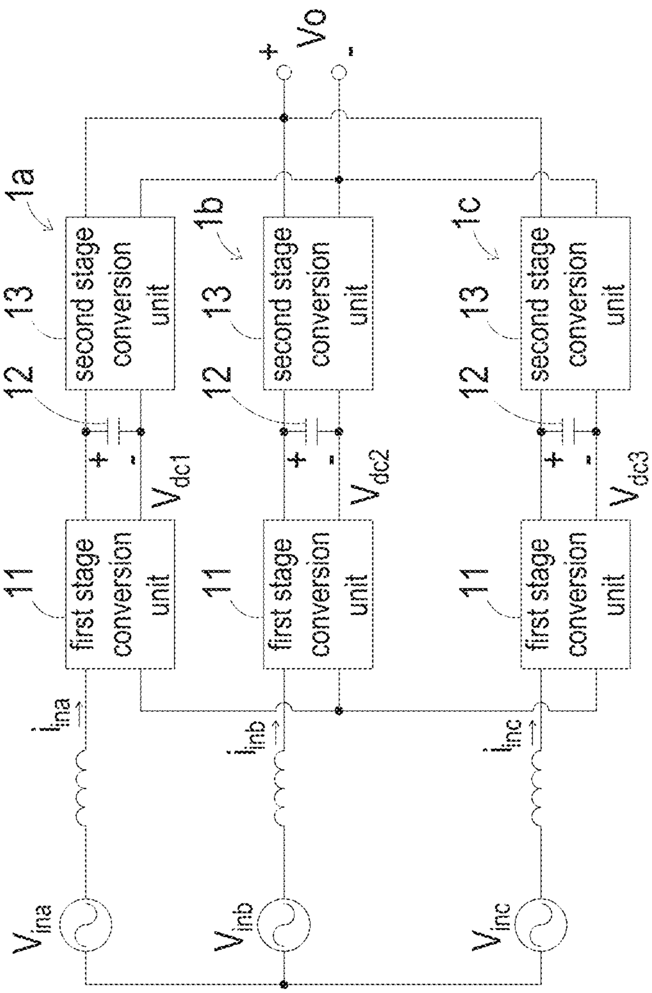
FIG. 10 is a schematic circuit diagram illustrating three two-stage converters applied to a three-phase power supply.
Figure 11:
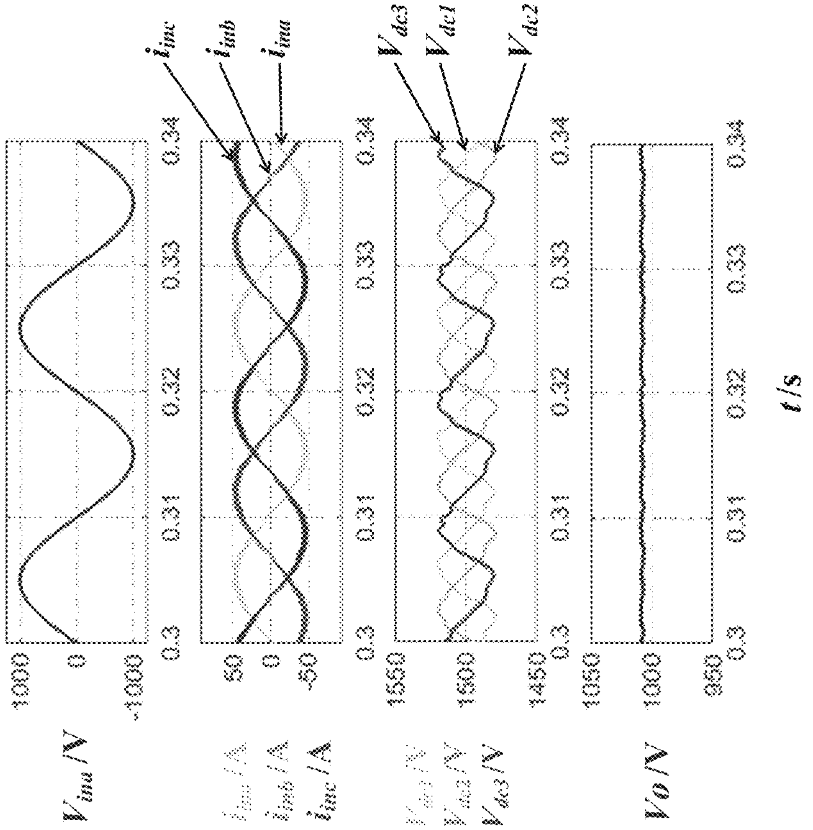
FIG. 11 schematically shows the waveforms of voltages and currents in the circuit topology shown in FIG. 10.

FIG. 10 is a schematic circuit diagram illustrating three two-stage converters applied to a three-phase power supply. As shown in FIG. 10, the three two-stage converters 1$a$, 1$b$ and 1$c$ are electrically connected to three phase voltages $V_{ina}$, $V_{inb}$ and $V_{inc}$ respectively and receive input currents $i_{ina}$, $i_{inb}$ and line respectively. The voltages on the capacitor units 12 of the three two-stage converters 1$a$, 1$b$ and 1$c$ are $V_{dc1}$, $V_{dc2}$ and $V_{dc3}$ respectively. The outputs of the three two-stage converters 1$a$, 1$b$ and 1$c$ are electrically connected in parallel and provide an output voltage Vo. FIG. 11 schematically shows the waveforms of voltages and currents in the circuit topology shown in FIG. 10. As shown in FIG. 11, each of the voltages $V_{dc1}$, $V_{dc2}$ and $V_{dc3}$ on the capacitor units 12 in three phases has a double-frequency ripple. Since the input currents $i_{ina}$, $i_{inb}$ and $i_{inc}$ of three phases are symmetric, the double-frequency ripples of three phases are cancelled out by each other at the output terminals of the three two-stage converters 1$a$, 1$b$ and 1$c$, and thus there is no double-frequency ripple in the output voltage Vo.

Figure 12:
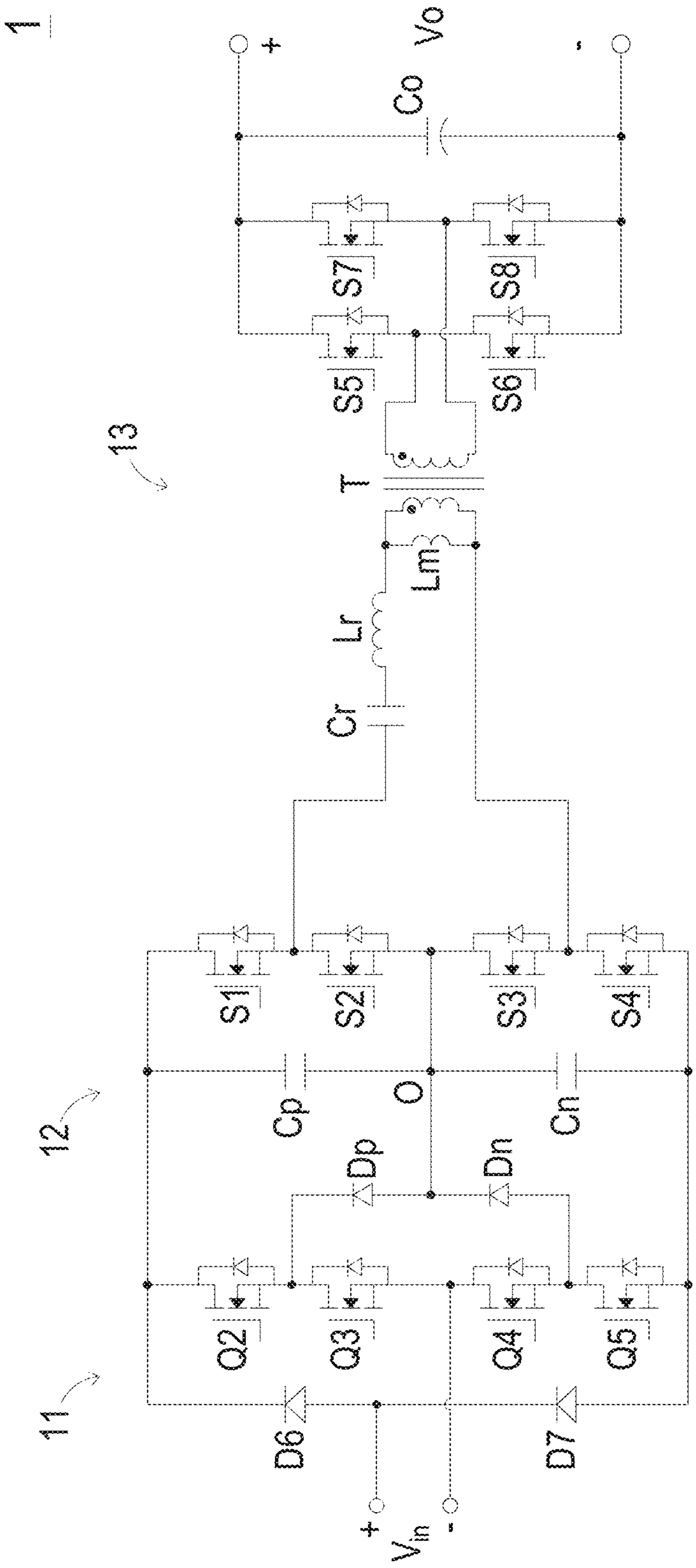
FIG. 12 is a schematic circuit diagram illustrating further another implementation of the two-stage converter of FIG. 2.

In addition, it is noted that the two-stage converter of the present disclosure is not limited to the implementation shown in FIG. 3. As an example, FIG. 12 is a schematic circuit diagram illustrating another implementation of the two-stage converter of FIG. 2. The main difference between the implementations shown in FIG. 12 and FIG. 3 is the circuit structure of the first stage conversion unit 11 and the second stage conversion unit 13. In the implementation shown in FIG. 12, the first stage conversion unit 11 is a neutral-point clamped power factor correction circuit, and the second stage conversion unit 13 is a series half-bridge LLC circuit. As shown in FIG. 12, the first stage conversion unit 11 includes diodes D6, D7, Dp and Dn and first stage switches Q2, Q3, Q4 and Q5. The diodes D6 and D7 are electrically connected in series to form a diode bridge arm, the first stage switches Q2, Q3, Q4 and Q5 are electrically connected in series to form a switch bridge arm, and the diode bridge arm and the switch bridge arm are electrically connected in parallel. The diodes Dp and Dn are electrically connected in series between a common node of the first stage switches Q2 and Q3 and a common node of the first stage switches Q4 and Q5. The capacitor unit 12 includes capacitors Cp and Cn electrically connected in series, and the bridge arm formed by the capacitors Cp and Cn are electrically connected in parallel to the switch bridge arm formed by the first stage switches Q2, Q3, Q4 and Q5. The primary switches S1, S2, S3 and S4 of the second stage conversion unit 13 are electrically connected in series to form a primary switch bridge arm which is electrically connected in parallel to the bridge arm formed by the capacitors Cp and Cn. Further, the common node O between the capacitors Cp and Cn is electrically connected to the common node between diodes Dp and Dn and the common node between primary switches S2 and S3.

Figure 13A:
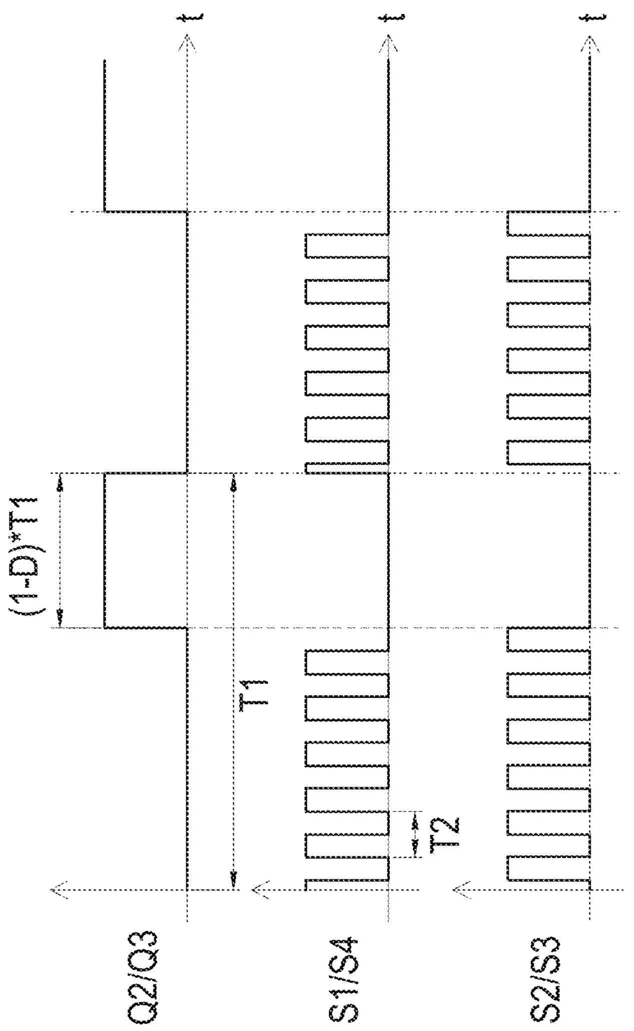
FIG. 13A and FIG. 13B schematically show the switch signals of a part of the switches of the two-stage converter of FIG. 12 performing the first control mode.
Figure 13B:
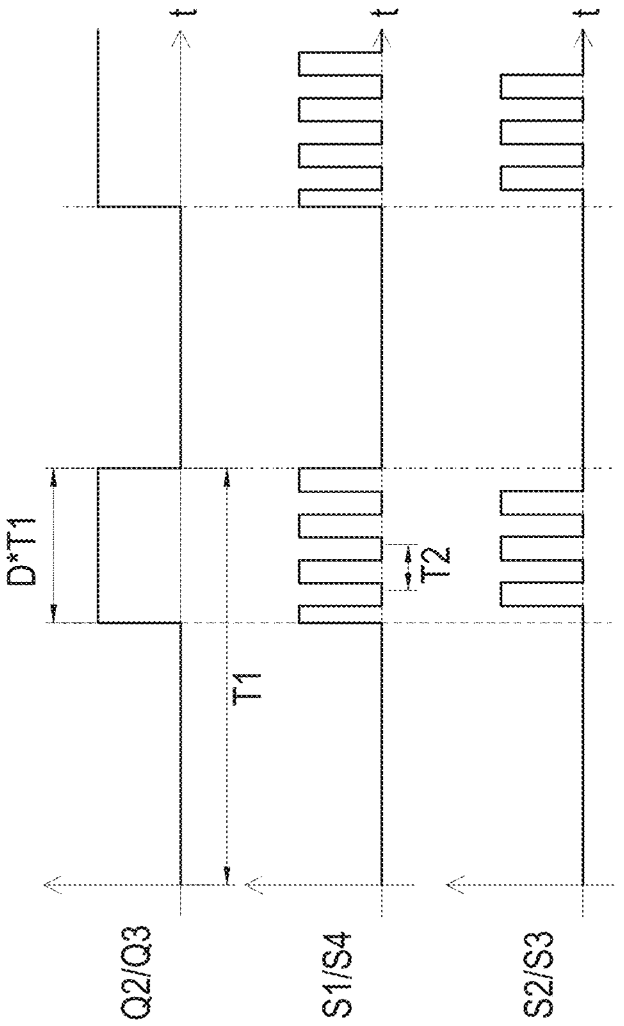

FIG. 13A and FIG. 13B schematically show the switch signals of a part of the switches of the two-stage converter of FIG. 12 performing the first control mode. The waveforms with the input current $i_{in}$ greater than zero and with the input current $i_{in}$ less than zero are shown in FIG. 13A and FIG. 13B respectively. In FIG. 13A and FIG. 13B, Q2/Q3 represents the switch signal of the first stage switches Q2 and Q3, S1/S4 represents the switch signal of the primary switches S1 and S4, S2/S3 represents the switch signal of the primary switches S2 and S3, and D represents the duty ratio of the first stage conversion unit 11 outputting the second power.

As shown in FIG. 13A, in the case that the input current $i_{in}$ is greater than zero, when the first stage switches Q2 and Q3 are off, the first stage conversion unit 11 outputs the second power, the second stage conversion unit 13 operates in the DCX mode, and the primary switches S1 to S4 are normally switched with high frequency. When the first stage switches Q2 and Q3 are on, the first stage conversion unit 11 stops outputting the second power, the second stage conversion unit 13 stops operating, and the primary switches S1 to S4 are maintained in the off state.

As shown in FIG. 13B, in the case that the input current $i_{in}$ is less than zero, when the first stage switches Q2 and Q3 are off, the first stage conversion unit 11 stops outputting the second power, the second stage conversion unit 13 stops operating, and the primary switches S1 to S4 are maintained in the off state. When the first stage switches Q2 and Q3 are on, the first stage conversion unit 11 outputs the second power, the second stage conversion unit 13 operates in the DCX mode, and the primary switches S1 to S4 are normally switched with high frequency.

Figure 14:
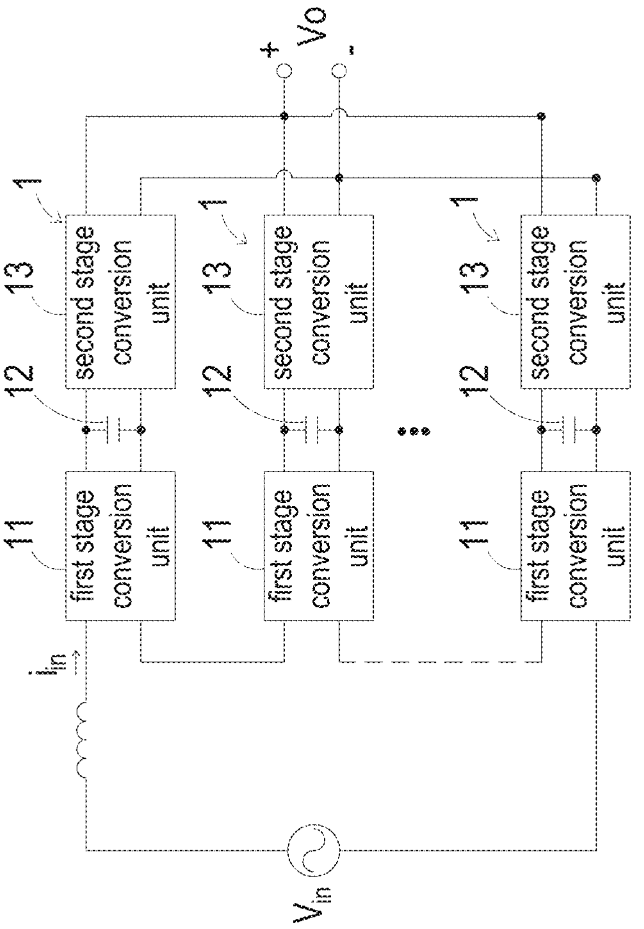
FIG. 14 is a schematic circuit diagram illustrating a cascaded system formed by two-stage converters.

It is noted that the two-stage converter and the control manner thereof are not limited to the application shown in FIG. 10. As an example, FIG. 14 is a schematic circuit diagram illustrating a cascaded system formed by two-stage converters. As shown in FIG. 14, the cascaded system is formed by N two-stage converters 1 with series-connected inputs and parallel-connected outputs, and N≥2. In the N two-stage converters 1, the first stage conversion unit 11 adopt distributed carrier phase-shift control, and the second stage conversion unit 13 follows the first stage conversion unit 11 to be enabled and disabled synchronously. Consequently, the distributed control of the cascaded system is realized. Similarly, the present invention may be applied in a three-phase system with series-connected inputs and parallel-connected outputs.

Figure 15:
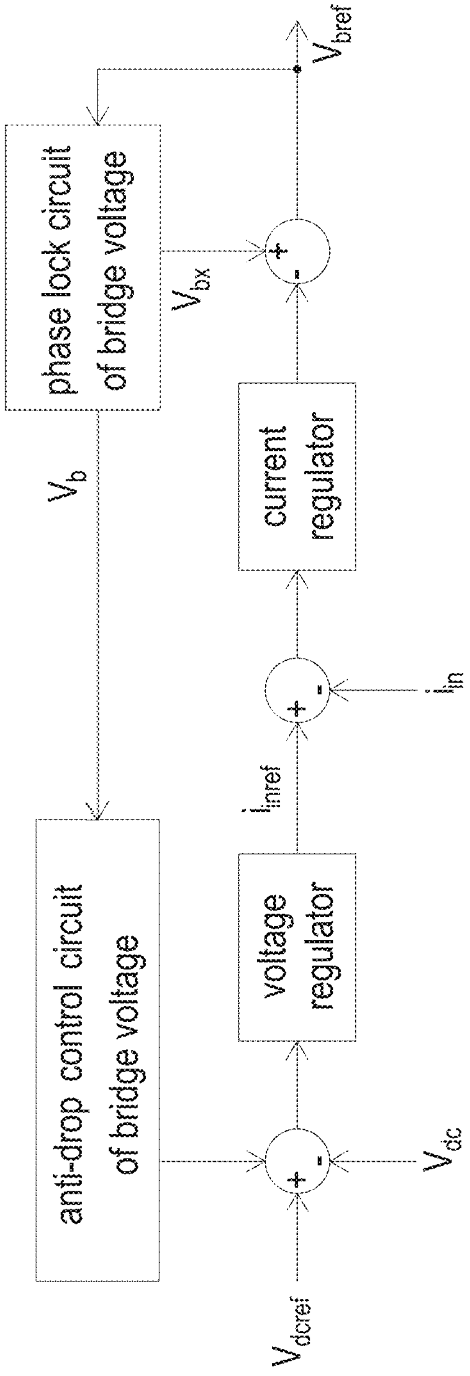
FIG. 15 is a schematic block diagram illustrating the controller for the first stage conversion unit of FIG. 14.

FIG. 15 is a schematic block diagram illustrating the controller for the first stage conversion unit 11 of FIG. 14. Compared with the controller shown in FIG. 5, the controller shown in FIG. 15 further includes an anti-drop control circuit of bridge voltage so as to equalize the input voltages of multiple first stage conversion units 11. In FIG. 15, $V_b$ is the bridge voltage across the bridge arm of the first stage conversion unit 11.

Figure 16:
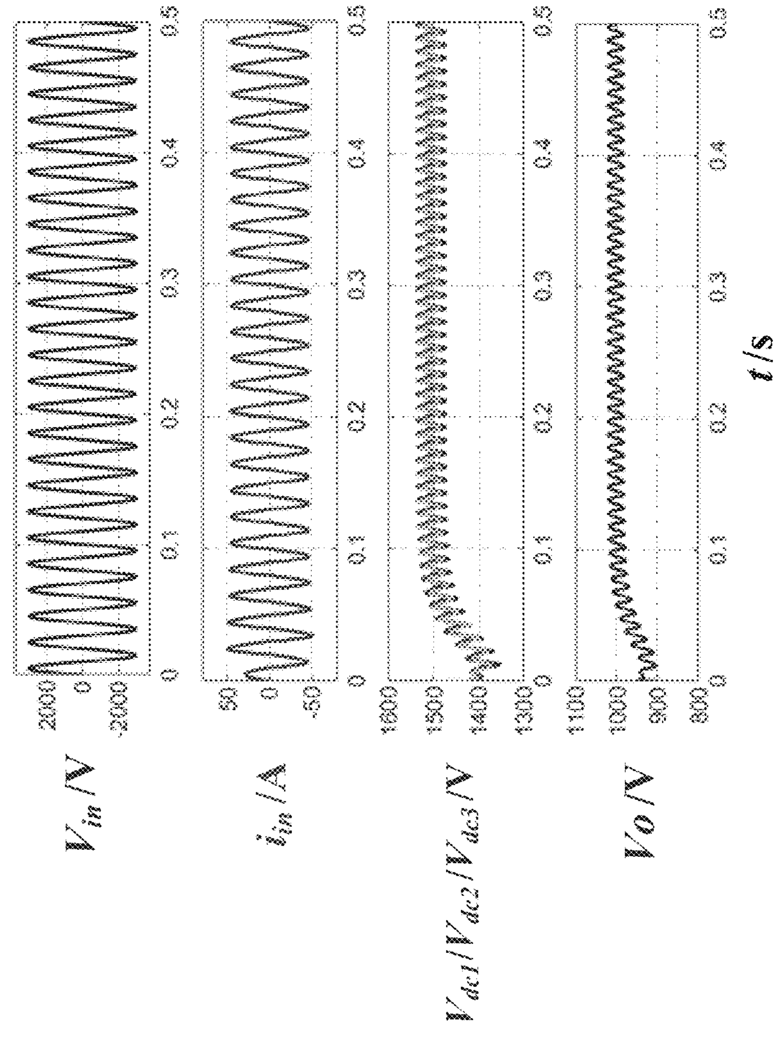
FIG. 16 schematically shows the simulation of the cascaded system of FIG. 14 with N=3 and the two-stage converters operating the first control mode.

FIG. 16 schematically shows the simulation of the cascaded system of FIG. 14 with N=3 and the two-stage converters operating the first control mode. In FIG. 16, $V_{dc1}$, $V_{dc2}$ and $V_{dc3}$ are the voltages on the capacitor units 12 of the first, second and third two-stage converters 1 respectively. As shown in FIG. 16, the first stage conversion unit 11 adopts the carrier phase-shift control, the second stage conversion unit 13 operates normally when the first stage conversion unit 11 outputs the second power, and the input current in and the output voltage Vo are stable.

Figure 17:
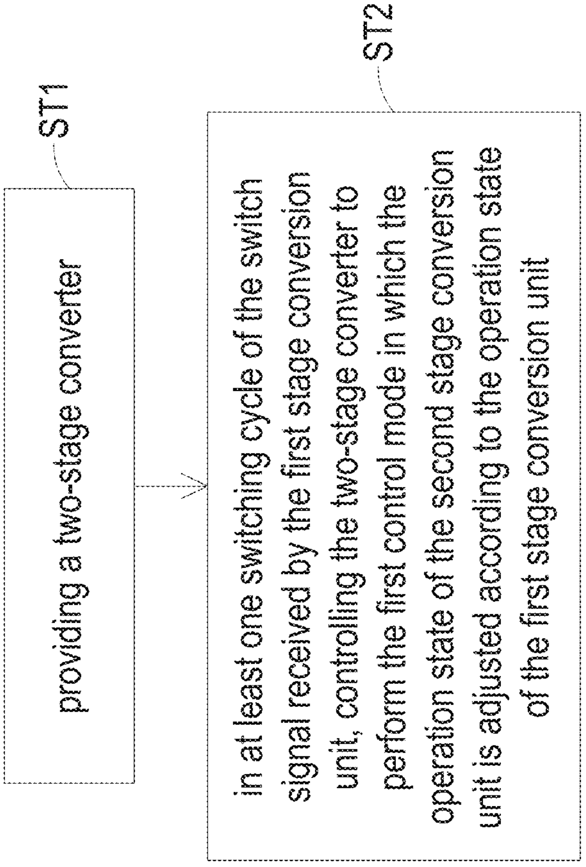
FIG. 17 is a schematic flow chart illustrating a control method of a two-stage converter according to an embodiment of the present disclosure.

FIG. 17 is a schematic flow chart illustrating a control method of a two-stage converter according to an embodiment of the present disclosure. The control method of this embodiment is adapted to the two-stage converter of any foregoing embodiment. As shown in FIG. 17, the control method includes steps ST1 and ST2. In step ST1, a two-stage converter 1 is provided. In step ST2, in at least one switching cycle T1 of the switch signal received by the first stage conversion unit 11, the two-stage converter 1 is controlled to perform the first control mode. In the first control mode, the operation state of the second stage conversion unit 13 is adjusted according to the operation state of the first stage conversion unit 11. In specific, when the operation state of the first stage conversion unit 11 is stopping outputting the second power, the operation state of the second stage conversion unit 13 is adjusted to stop operating. When the operation state of the first stage conversion unit 11 is outputting the second power, the operation state of the second stage conversion unit 13 is adjusted to operate normally. Further, when the operation state of the second stage conversion unit 13 is operating normally, the second stage conversion unit 13 receives high-frequency switch signals and operates in the DCX mode.

In an embodiment, the control method further includes steps of: determining the operation state of the first stage conversion unit 11 according to at least one signal in the two-stage converter 1; and outputting or stopping outputting the high-frequency switch signals to the second stage conversion unit 13 according to the operation state of the first stage conversion unit 11. In an embodiment, in at least another switching cycle T1, the two-stage converter 1 is controlled to perform the second control mode in which the second stage conversion unit 13 is controlled to keep operating normally. Under this circumstance, the control method further includes determining the control mode of the two-stage converter 1 in each first switching cycle T1 according to the time of the first stage conversion unit 11 outputting the second power or the input current $i_{in}$ of the first stage conversion unit 11. Correspondingly, it is controlled to output or stop outputting the high-frequency switch signals to the second stage conversion unit 13 according to the operation state of first stage conversion unit 11 and the control mode of two-stage converter 1.

The two-stage converter and the control method thereof of the present disclosure has great applicability and may be applied in various applications such as fast charging station, photovoltaic power station, data center, energy storage, and microgrid.

In summary, the present disclosure provides a two-stage converter and a control method thereof in which the operation state of the back-stage is adjusted according to the operation state of the front-stage for reducing the double-frequency ripple and front-stage switching-frequency ripple in the current flowing through the capacitor between the front-stage and back-stage. Thereby, the power density and efficiency of the two-stage converter are improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A two-stage converter, comprising:

a first stage conversion unit, receiving a first power, and converting the first power into a second power;

a capacitor unit, electrically connected to the first stage conversion unit to receive the second power; and a second stage conversion unit, electrically connected to the capacitor unit to receive a power transmitted by the capacitor unit, wherein the first stage conversion unit receives a switch signal which has a switching cycle, and in at least one said switching cycle, the two-stage converter performs a first control mode in which an operation state of the second stage conversion unit is adjusted according to an operation state of the first stage conversion unit.

2. The two-stage converter according to claim 1, wherein in the first control mode, when the operation state of the first stage conversion unit is stopping outputting the second power, the operation state of the second stage conversion unit is adjusted to stop operating, and when the operation state of the first stage conversion unit is outputting the second power, the operation state of the second stage conversion unit is adjusted to operate normally.

3. The two-stage converter according to claim 2, wherein the first stage conversion unit has a plurality of first signals reflecting the operation state of the first stage conversion unit, the capacitor unit has a plurality of second signals reflecting the operation state of the first stage conversion unit, and the two-stage converter determines the operation state of the first stage conversion unit according to at least one said first signal or at least one said second signal.

4. The two-stage converter according to claim 2, wherein the two-stage converter determines the operation state of the first stage conversion unit according to the switch signal, the operation state of the first stage conversion unit is outputting the second power when the switch signal is at a first level, and the operation state of the first stage conversion unit is stopping outputting the second power when the switch signal is at a second level.

5. The two-stage converter according to claim 2, wherein when the operation state of the second stage conversion unit is operating normally, the second stage conversion unit receives a high-frequency switch signal.

6. The two-stage converter according to claim 2, further comprising:

a first driving circuit, configured to output the switch signal to the first stage conversion unit;

a state determination circuit, configured to determine the operation state of the first stage conversion unit according to at least one signal in the two-stage converter; and a second driving circuit, configured to output or stop outputting a high-frequency switch signal to the second stage conversion unit according to a determination result of the state determination circuit.

7. The two-stage converter according to claim 2, wherein in at least another switching cycle, the two-stage converter performs a second control mode in which the second stage conversion unit operates normally and continuously.

8. The two-stage converter according to claim 7, wherein in the first control mode, a high-frequency switch signal is outputted to control the second stage conversion unit to operate normally when the first stage conversion unit is outputting the second power, and the high-frequency switch signal is blocked to control the second stage conversion unit to stop operating when the first stage conversion unit is stopping outputting the second power; and wherein in the second control mode, the high-frequency switch signal is outputted continuously to control the second stage conversion unit to operate normally.

9. The two-stage converter according to claim 7, further comprising:

a first driving circuit, configured to output the switch signal to the first stage conversion unit;

a state determination circuit, configured to determine the operation state of the first stage conversion unit according to at least one signal in the two-stage converter;

a mode determination circuit, configured to determine a control mode of the two-stage converter according to a time of the first stage conversion unit outputting the second power or an input current of the first stage conversion unit; and a second driving circuit, configured to output or stop outputting a high-frequency switch signal to the second stage conversion unit according to determination results of the state determination circuit and the mode determination circuit.

10. The two-stage converter according to claim 9, wherein the mode determination circuit comprises:

a threshold set sub-circuit, configured to calculate a threshold duty ratio according to a first ratio value and a second ratio value, and to calculate a threshold time according to the threshold duty ratio and the switching cycle; and a comparison sub-circuit, configured to compare the time of the first stage conversion unit outputting the second power with the threshold time, wherein the mode determination circuit determines the two-stage converter to perform the first control mode if the time of the first stage conversion unit outputting the second power is longer than the threshold time, and the mode determination circuit determines the two-stage converter to perform the second control mode if the time of the first stage conversion unit outputting the second power is shorter than or equal to the threshold time.

11. The two-stage converter according to claim 10, wherein in each said switching cycle, a switching-frequency current in the capacitor unit has a first effective value when the two-stage converter performs the first control mode, the switching-frequency current in the capacitor unit has a second effective value when the two-stage converter performs the second control mode, a ratio value of the first effective value to the input current is the first ratio value, a ratio value of the second effective value to the input current is the second ratio value, and calculate the threshold duty ratio according to an expression:

$$\frac{k2-k1}{k2}=M$$

where k1 is the first ratio value, k2 is the second ratio value, and M is a preset value.

12. The two-stage converter according to claim 9, wherein the mode determination circuit comprises:

a threshold set sub-circuit, configured to set a threshold; and a comparison sub-circuit, configured to compare an absolute value of the input current with the threshold, the mode determination circuit determines the two-stage converter to perform the first control mode if the absolute value of the input current is greater than the threshold, and the mode determination circuit determines the two-stage converter to perform the second control mode if the absolute value of the input current is less than or equal to the threshold.

13. A control method of a two-stage converter, wherein the two-stage converter comprises a first stage conversion unit, a capacitor unit and a second stage conversion unit, the first stage conversion unit receives a first power and converts the first power into a second power, the capacitor unit is electrically connected to the first stage conversion unit to receive the second power, the second stage conversion unit is electrically connected to the capacitor unit to receive a power transmitted by the capacitor unit, the first stage conversion unit receives a switch signal which has a switching cycle, and the control method comprises:

in at least one said switching cycle, controlling the two-stage converter to perform a first control mode in which an operation state of the second stage conversion unit is adjusted according to an operation state of the first stage conversion unit.

14. The control method according to claim 13, wherein in the first control mode, when the operation state of the first stage conversion unit is stopping outputting the second power, adjusting the operation state of the second stage conversion unit to stop operating, and when the operation state of the first stage conversion unit is outputting the second power, adjusting the operation state of the second stage conversion unit to operate normally.

15. The control method according to claim 14, comprising steps of:

determining the operation state of the first stage conversion unit according to at least one signal in the two-stage converter; and outputting or stopping outputting a high-frequency switch signal to the second stage conversion unit according to the operation state of the first stage conversion unit.

16. The control method according to claim 14, wherein in at least another switching cycle, controlling the two-stage converter to perform a second control mode in which the second stage conversion unit operates normally and continuously.

17. The control method according to claim 16, comprising steps of:

determining the operation state of the first stage conversion unit according to at least one signal in the two-stage converter;

determining a control mode of the two-stage converter according to a time of the first stage conversion unit outputting the second power or an input current of the first stage conversion unit; and outputting or stopping outputting a high-frequency switch signal to the second stage conversion unit according to the operation state of the first stage conversion unit and the control mode of the two-stage converter.

18. The control method according to claim 17, wherein the step of determining the control mode of the two-stage converter comprises:

calculating a threshold duty ratio according to a first ratio value and a second ratio value, and calculating a threshold time according to the threshold duty ratio and the switching cycle;

comparing the time of the first stage conversion unit outputting the second power with the threshold time; and determining the two-stage converter to perform the first control mode if the time of the first stage conversion unit outputting the second power is longer than the threshold time, and determining the two-stage converter to perform the second control mode if the time of the first stage conversion unit outputting the second power is shorter than or equal to the threshold time.

19. The control method according to claim 18, wherein in each said switching cycle, a switching-frequency current in the capacitor unit has a first effective value when the two-stage converter performs the first control mode, the switching-frequency current in the capacitor unit has a second effective value when the two-stage converter performs the second control mode, a ratio value of the first effective value to the input current is the first ratio value, a ratio value of the second effective value to the input current is the second ratio value, and calculate the threshold duty ratio according to an expression:

$$\frac{k2 - k1}{k2} = M$$

where k1 is the first ratio value, k2 is the second ratio value, and M is a preset value.

20. The control method according to claim 17, wherein the step of determining the control mode of the two-stage converter comprises:

setting a threshold;

comparing an absolute value of the input current with the threshold; and determining the two-stage converter to perform the first control mode if the absolute value of the input current is greater than the threshold, and determining the two-stage converter to perform the second control mode if the absolute value of the input current is less than or equal to the threshold.

* * * * *